(12) United States Patent
Gay

(10) Patent No.: US 7,597,287 B2
(45) Date of Patent: Oct. 6, 2009

(54) DEVICE FOR REINFORCEMENT OF A HOLLOW STRUCTURE, ESPECIALLY A BOX STRUCTURE FOR AN AIRCRAFT AND A HOLLOW STRUCTURE EQUIPPED WITH SUCH A DEVICE

(75) Inventor: Stephane Gay, Toulouse (FR)

(73) Assignee: Airbus France, Toulouse (FR)

( * ) Notice: Subject to any disclaimer, the term of this patent is extended or adjusted under 35 U.S.C. 154(b) by 474 days.

(21) Appl. No.: 11/090,477

(22) Filed: Mar. 25, 2005

(65) Prior Publication Data
US 2005/0230528 A1 Oct. 20, 2005

(30) Foreign Application Priority Data
Mar. 25, 2004 (FR) .................................. 04 03089

(51) Int. Cl.
*B64C 1/08* (2006.01)
(52) U.S. Cl. ................... 244/123.4; 244/123.1; 52/690; 14/4
(58) Field of Classification Search .............. 244/123.1, 244/123.2, 123.4, 123.14, 119, 117 R; 14/4, 14/6, 13; 52/693, 690, 691, 692, 695, 697
See application file for complete search history.

(56) References Cited

U.S. PATENT DOCUMENTS

| | | | | |
|---|---|---|---|---|
| 1,438,685 A | * | 12/1922 | Belcher | 244/123.4 |
| 1,545,129 A | * | 7/1925 | Cook, Jr. | 52/653.2 |
| 1,555,409 A | * | 9/1925 | Gilmore | 244/123.4 |
| 1,619,372 A | * | 3/1927 | Rohrbach | 244/123.4 |
| 1,765,189 A | * | 6/1930 | Woolgar, Jr. | 244/123.4 |
| 1,775,386 A | * | 9/1930 | Blondin | 244/123.4 |
| 1,790,144 A | * | 1/1931 | Haller | 244/123.4 |
| 1,799,889 A | * | 4/1931 | Dornier | 244/123.7 |
| 1,810,762 A | * | 6/1931 | Gish | 244/117 R |
| 1,829,922 A | * | 11/1931 | Carns | 244/123.4 |
| 1,988,079 A | * | 1/1935 | Henrichsen | 244/123.4 |
| 2,171,434 A | * | 8/1939 | Ragsdale et al. | 105/399 |
| 2,382,357 A | * | 8/1945 | Watter | 52/222 |
| 2,791,386 A | * | 5/1957 | Kastan | 244/123.8 |

(Continued)

FOREIGN PATENT DOCUMENTS

FR              933229          4/1948

(Continued)

*Primary Examiner*—Michael Carone
*Assistant Examiner*—Benjamin P Lee
(74) *Attorney, Agent, or Firm*—Patterson, Thuente, Skaar & Christensen, P.A.

(57) ABSTRACT

A device for reinforcement of hollow structures such as aircraft boxes, composed of a front panel, an upper panel, a lower panel, and a rear panel, the device comprising a network of reinforcement rods with the ends attached to at least some of the panels comprising the structure. The device comprises at least a first rod and a second rod, both inclined, the first end of the first rod being attached to the internal side of the front panel, the second end of the first rod being attached to the internal side of the upper panel, the second end of the second rod being attached to the internal side of the lower panel, the device comprising in addition a third rod connecting said second ends of said first and second rods, the first, second and third rods thus comprising a reinforcement triangle.

6 Claims, 2 Drawing Sheets

U.S. PATENT DOCUMENTS

| | | | | |
|---|---|---|---|---|
| 3,249,327 | A | * | 5/1966 | Smith, Jr. .................. 244/123.1 |
| 3,436,038 | A | * | 4/1969 | Cox et al. ................. 244/123.2 |
| 4,200,946 | A | * | 5/1980 | Lawrence ....................... 14/4 |
| 4,776,534 | A | * | 10/1988 | Bamford ................. 244/123.4 |
| 5,534,354 | A | * | 7/1996 | Gregg et al. ................. 428/593 |
| 6,539,571 | B1 | * | 4/2003 | Forsyth ......................... 14/14 |
| 6,804,927 | B2 | * | 10/2004 | Forsyth et al. ................ 52/636 |

FOREIGN PATENT DOCUMENTS

| | | |
|---|---|---|
| GB | 367048 | 2/1932 |
| GB | 439954 | 12/1935 |
| JP | 2003342957 | 12/2003 |

* cited by examiner

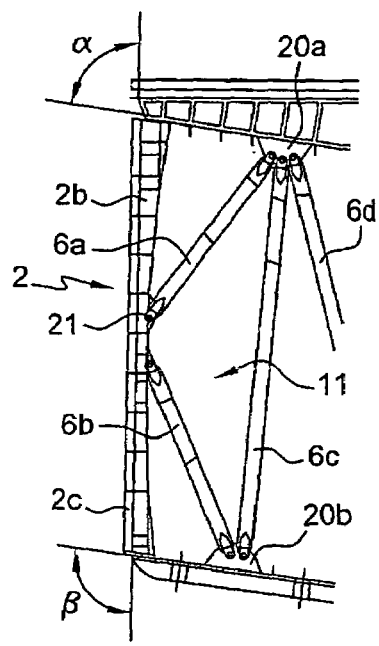
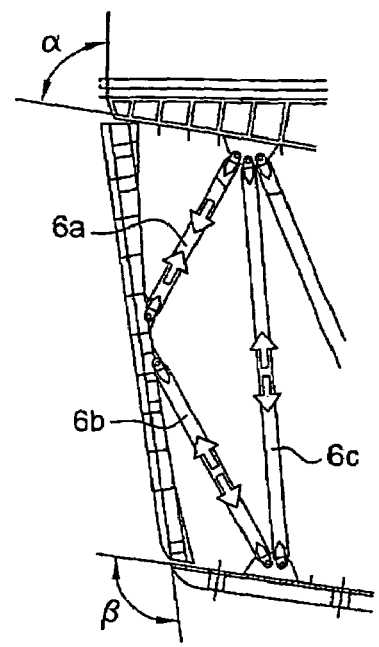
Fig. 3a  Fig. 3b
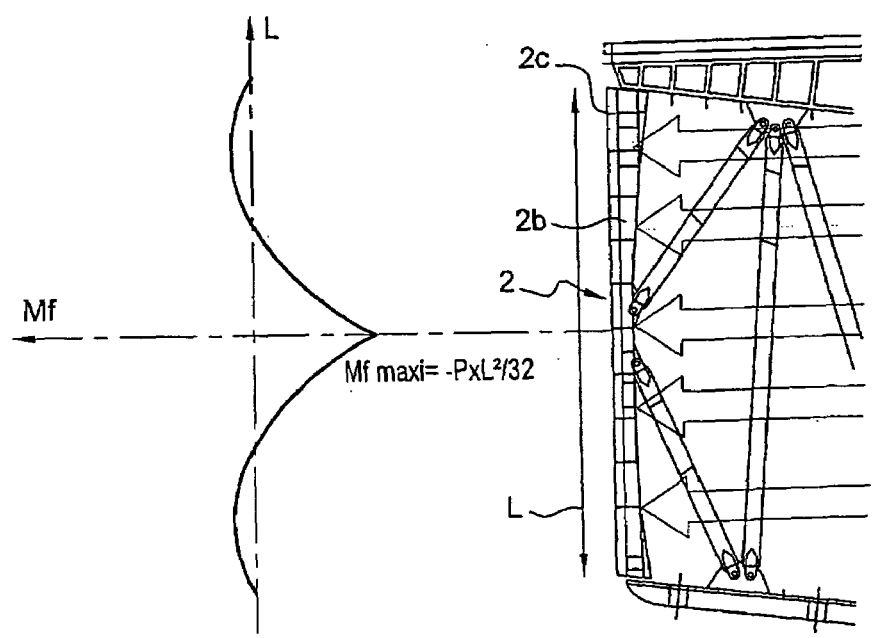
Fig. 4

DEVICE FOR REINFORCEMENT OF A HOLLOW STRUCTURE, ESPECIALLY A BOX STRUCTURE FOR AN AIRCRAFT AND A HOLLOW STRUCTURE EQUIPPED WITH SUCH A DEVICE

RELATED APPLICATION

The present application claims priority to French Application No. 04 03089 filed Mar. 25, 2004.

TECHNICAL FIELD

This invention relates to reinforcement of hollow structures and especially box structures for aircraft.

BACKGROUND ART

The box structures of aircraft or other vehicles must contribute to the rigidity of the vehicle, and, for example, in the case of the central wing box of an aircraft, the structure is subject to major mechanical loads and must therefore have good fatigue strength in order to reduce the onset of cracks under load, especially in flight and on the ground. A fortiori, if the box is used as a fuel tank, it must have good static strength in case of sudden deceleration. Its mass, moreover, must remain low, even in the case of jumbo aircraft, and it must be easy to assemble.

The practice of placing rod lattices within the box structure as reinforcing ribs is known, and for this purpose these lattices are attached to the internal panels comprising the boxes.

The conventional construction of boxes provided with rod lattices is based on the rule of optimization of the number of rods which is based in turn on the principle of implementation of a triangularly braced isostatic system in which the rods and the segments of the panels between the rods are like bars, and the connecting points between the rods and the box panels and between the box panels are like nodes. The system is called isostatic and the number of bars is optimum when the relationship $2n-3=b$ is observed, in which n is the number of nodes and b is the number of bars.

In the case in which $2n-3$ is less than b, the system is hyperstatically non-deformable, but there are $b-(2n-3)$ excess bars.

In the case in which $2n-3$ is greater than b, the system is hyperstatically deformable, but there are $b-(2n-3)$ bars short.

Nevertheless, this definition is a theoretical rule and at it does not take into account the specific stresses on a box structure, such as the need to reinforce certain parts of the box, especially the front part of the box which can be subject to the impact of the fuel or objects contained in the box during an impact.

SUMMARY OF THE INVENTION

This invention relates to the creation of a hollow structure such as a box, reinforced by a reinforcement device composed of a rod lattice, the lattice being optimized in order to minimize the number of rods, while maintaining good rigidity of the structure and reinforcing specific zones of the box's structure, such as the front part of the box.

This invention is especially well suited to the manufacture of partitioned boxes.

To this end, this invention relates to the manufacture of a device for reinforcement of hollow structures such as aircraft boxes, composed of a front panel, an upper panel, a lower panel, and a rear panel, the device comprising a network of reinforcement rods with the ends attached to at least some of the panels comprising the structure, characterized in that it comprises at least a first rod and a second rod, both inclined, the first end of the first rod being attached to the internal side of the front panel, while the second end of the first rod is attached to the internal side of the upper panel, the second end of the second rod being attached to the internal side of the lower panel, and in that it comprises a third rod connecting said second ends of said first and second rods, the first, second and third rods thus comprising a reinforcement triangle.

The structure constituted in this way is isostatic and comprises the optimum number of rods. It forms a reinforced structure able to dynamically withstand major stresses in flight, as well as in the take-off and landing phases. Moreover, when it is used to build a fuel tank box, this reinforced structure is able to withstand the fuel pressure applied to the front panel in the case of sudden deceleration.

More specifically, besides the first, second and third rods the device comprises p other rods connecting certain of the lower, upper and rear panels, the total number of rods added to the number of panel sections between the rods and of panels between them being equal to twice the sum of the total number of link nodes between the rods and panels and of the number of links between the panels.

The invention also relates to a hollow structure such as an aircraft box, comprising a front panel, an upper panel, a lower panel and a rear panel, this structure being provided with a rod reinforcement device, characterized in that the rod reinforcement device comprises a first reinforcement triangle, called the front reinforcement triangle, composed of three rods connected in pairs, attached by its vertices to the front panel and to the upper and lower panels.

More specifically, the vertex of the front reinforcement triangle attached to the front panel is fixed more or less halfway up the front panel.

Advantageously the structure includes at least one intermediate partition between the front panel and the rear panel and forms a front box and a rear box, a second reinforcement triangle, called the intermediate reinforcement triangle, being created at the level of the intermediate partition, and the second triangle in particular may be located in the rear box.

In one specific embodiment, the structure can advantageously comprise a rear reinforcement triangle, composed of three rods connected in pairs, attached by its vertices to the rear panel and to the upper and lower panels.

The structure can moreover be provided with n rods connecting the panels, the total number of rods added to the number of panel sections between the rods being equal to twice the sum of the total number of link nodes between the rods and panels and of the number of links between the panels, characterized in that it comprises a plurality of longitudinal reinforcement triangles, each longitudinal triangle comprising a vertex or tip fixed at an almost median or centered position or point of an integral vertical reinforcement element joined to the lower and upper panels.

The structure can comprise a plurality of longitudinal boxes, each longitudinal box composing a front wall comprising said vertical reinforcement element. The structure can in particular comprise the central wing box of an aircraft, at least one part of which holds the fuel.

Other characteristics and advantages of the invention will become apparent by reading the following description of particular, non-limiting embodiments of the invention with reference to the figures.

BRIEF DESCRIPTION OF THE DRAWINGS

FIGS. 3a and 3b depict a detail of the front part of the structure from FIG. 2 empty and loaded, respectively; and FIG. 4 depicts a detail of the front part of the structure in FIG. 2 subjected to a compression load.

DETAILED DESCRIPTION OF THE DRAWINGS

Figure 1:
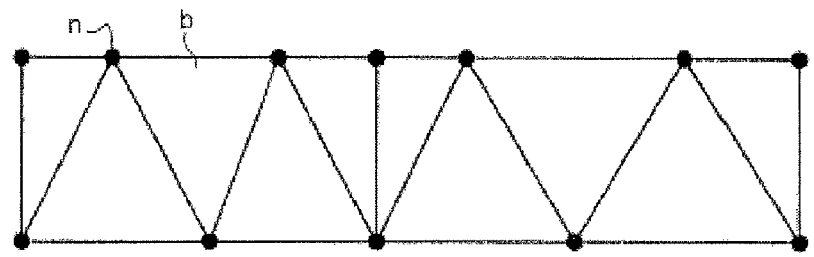
FIG. 1 depicts a schematic diagram of a prior-art embodiment of an isostatic structure.

FIG. 1 depicts a diagram of the embodiment of a box referenced to a theoretical triangularly braced isostatic system. According to this diagram, the intersections of the elements are called nodes n and the segments between the nodes are called bars b.

In the case of a box, the bars serve as both box segments and rods.

In this system, isostaticity is obtained with the optimum number of bars, since there are 12 nodes n and 21 bars b; this satisfies the relationship 2n−3=b.

But this system is not optimal if stresses are applied to certain parts of the box, and these stresses can be the pressure of the fuel contained in the box on the front panel during sudden deceleration or application of cabin pressure to the structure which has the tendency to make the front and rear panels deflect; this pressure originates from the outside of the structure and comprises a fatigue-generating load that reoccurs each time the cabin is pressurized.

Figure 2:
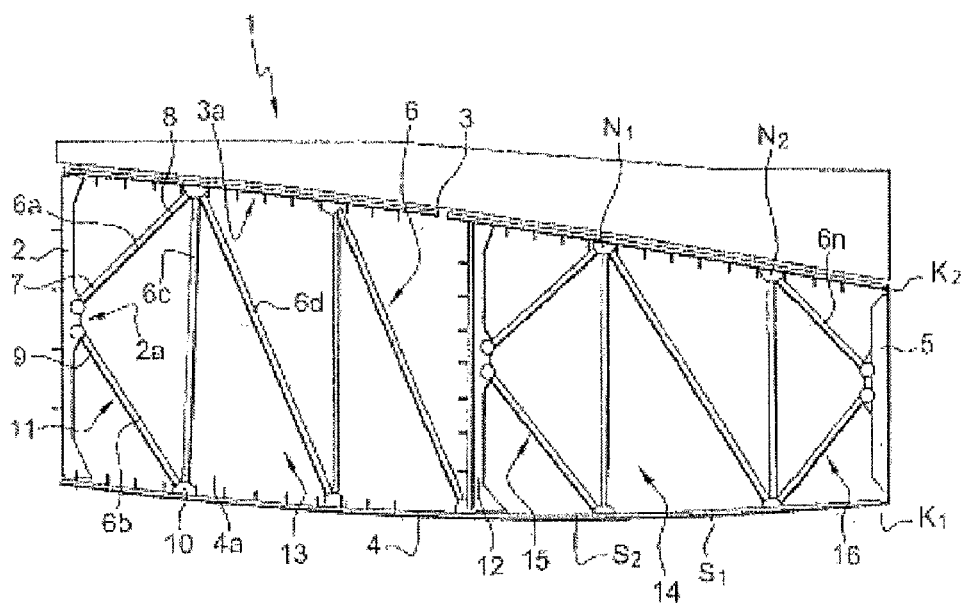
FIG. 2 depicts a schematic diagram of a structure fashioned as claimed in the invention.

FIG. 2 depicts one embodiment of a device for reinforcement of hollow structures 1, such as a box-type aircraft structure, as claimed in the invention.

The illustrated hollow structure is the central wing box of an aircraft, this box being located at the level of the wing root.

The structure is composed of a front panel 2, an upper panel 3, a lower panel 4, and a rear panel 5.

These panels are assembled in the conventional manner and comprise anchoring tabs 20a and 20b on which the reinforcement rods 6a, 6b, . . . , 6n which are arranged in a lattice are fixed.

The approach as claimed in the invention is to locally adapt the architecture of the rod lattice in order to create a triangular bracing function and especially a center support point on the pillars of the spars of the vertical panels, such as the front panel.

The structure chosen will use a reinforcement device comprising a network of rods 6a, 6b, . . . , 6n in a lattice, of which the ends are attached to the panels 2, 3, 4, 5 comprising the structure. The lattice is arranged such that a first rod 6a and a second rod 6b are inclined and comprise a first end 7, 9 attached to the internal side 2a of the front panel 2, their second ends 8, 10 being attached to the internal side 3a of the upper panel 3 and on the internal side 4a of the lower panel 4, respectively. A third, essentially vertical rod 6c connects said second ends 8, 10 of the first and second rods 6a, 6b such that the first, second and third rods 6a, 6b, 6c comprise a reinforcement triangle 11 at the level of the front panel.

Thus, as shown in FIG. 3a, the reinforcement triangle of the front panel 2 is formed with rods 6a, 6b, and 6c attached to the attachment tabs 20a, 20b by bolts 21.

The lattice is extended by a rod 6d which is attached to the attachment tab 20a, connecting the top panel 3 to the bottom panel 4 according to an incline which is compatible with the execution of the lattice which, in order to preserve isostaticity at an optimum number of rods, comprises p other rods 6d, . . . , 6n connecting certain of the lower 4, upper 3 and rear 5 panels, the total number of rods 6a, 6b, . . . , 6n added to the number of sections S1, S2, . . . of panels between the rods and of panels between them being equal to twice the sum of the total number of link nodes N1, N2, . . . between the rods and panels and of the number of links K1, K2, . . . between the panels.

The triangular bracing of the front panel by the rod lattice allows local accommodation of the loads in the rod lattice rib and implements a triangular bracing module which helps stop the box from deforming and helps limit internal stresses in the rods.

The front panel 2 in particular comprises pillars 2b, arranged longitudinally along the panel, and a skin 2c, and comprises a structural spar of the box. The rods are attached to the pillars 2b of the panel.

The first and second rods (6a, 6b) are dimensioned such that the vertex of the front reinforcement triangle 11 is attached to the pillar 2b of the front panel 2 essentially midway up the front of panel 2.

The connection of the first and second rods 6a, 6b at the level of a center support point of the front panel 2 makes it possible to simplify the structure of the pillars 2b of this panel by the formation of a supplementary support on the center line of the spar formed by this panel. Moreover, the configuration of this center support point makes it possible to limit the bending moment in the pillar 2b on which the rods are attached.

An illustration of the front of the structure of the central wing box of an aircraft at rest is shown in FIG. 3a and in flight in FIG. 3b.

At rest, as shown in FIG. 3a, no stress other than the weight of the aircraft is applied and the structure at the level of the triangle 11 is in equilibrium without deformation. The angles $\alpha$ and $\beta$ shown in the figure are the angles defined between the front panel and the lower panel and upper panel respectively.

FIG. 3b shows the structure at the level of the front panel in flight. The aerodynamic stresses applied to the wings cause deformation of the box such that the angles $\alpha$ and $\beta$ vary, the angle $\alpha$ becoming more acute while the angle $\beta$ increases. The levels of stresses engendered by this deformation are very significant. The triangular arrangement of the rods makes it possible to limit this deformation. Rods 6a and 6b make it possible to limit the variations of these angles as the front zone of the box is made rigid. The rod 6c makes triangular bracing effective and equalizes the stresses represented by the deflections in the other two rods.

This configuration which increases the number of rods locally makes it possible to reduce the sections of the rods and to significantly reduce the mass of the rod lattice.

Thus, the values of the stresses and moments in the pillars and the values of the stresses in the rods are lower than in the conventional rod lattice of FIG. 1.

The structure is put into general use by placing at least one intermediate partition 12 between the front panel 2 and the rear panel 5 and while triangularly bracing the intermediate partition.

A front box 13 and rear box 14 are defined in this way.

The rear box comprises a second reinforcement triangle, called the intermediate reinforcement triangle 15, implemented at the level of the intermediate partition 12, and a third reinforcement triangle, called the rear triangle 16, in order to further increase the gain in mass of the rods and the rigidity of the assembly.

The rear triangle 16 is composed of three rods 6n-2, 6n-1, 6n connected in pairs and is attached by its vertices to the rear panel 5 and to the upper panel 3 and lower panel 4. The structure is thus made more rigid at the level of the four angles of the box.

The central wing box of an aircraft made in this way can be used to hold fuel in at least one of its component parts. By way of example, the structure as claimed in the invention can be used for a jumbo aircraft for which the central wing box has a mass of roughly 11 tons, measuring roughly 7 meters long and 7 meters wide with a height of 2.4 m at the front and 1.6 m at the rear.

For such a box divided in two, the increase in mass for the front box is 97 kilograms for 11 pillars of this box. The deflection of the pillars under stress is moreover reduced from 6.73 to 3.2 mm while the maximum fatigue load resistance is roughly 64 $N/mm^2$ instead of 100 $N/mm^2$.

In the case of certification called "fuel crash" the maximum stress applied to the pillars of the front panel determines its cross-section, and the triangularly braced structure as claimed in the invention, such as is shown in FIG. 4, makes it possible to divide by 4 the maximum stress applied to the pillars and the front panel, the bending moment Mf being equal $-P.L^2/32$ instead of $-P.L^2/8$.

Likewise, the configuration with the center support point makes it possible to divide by 4 the stresses in the pillars 2b and in the skin 2c of the spars due to the application of cabin pressure. This triangularly braced configuration makes it possible moreover to divide by 2 the deflection received by the skin/pillar assembly.

The invention is not limited to the illustrated examples and in particular according to the principle of the invention a central wing box could be configured which would comprise a plurality of longitudinal boxes 13, 14, each longitudinal box comprising a front wall 2, 12 which forms a vertical reinforcing element provided with a triangle of rods.

The invention claimed is:

1. A hollow structure, such as a box of an aircraft, comprising:
    a front panel;
    an upper panel;
    a lower panel;
    a rear panel;
    at least one intermediate partition between the front panel and the rear panel, defining a front box and a rear box of an aircraft; and
    a rod reinforcement device, wherein the rod reinforcement device comprises
        a front reinforcement triangle comprising three rods, wherein a first end of a first rod is coupled to a first end of the second rod defining a first vertex, a second end of the first rod is coupled to the first end of a third rod defining a second vertex, and a second end of the second rod is coupled to a second end of the third rod defining a third vertex, the three rods thereby forming said front reinforcement triangle, the front reinforcement triangle being coupled by the first vertex to the front panel, by the second vertex to the upper panel, and by the third vertex to the lower panel, wherein the first and second rods forming the first vertex of the front reinforcement triangle being the only rods coupled to the front panel, and
        an intermediate reinforcement triangle positioned proximate the at least one intermediate partition, the intermediate reinforcement triangle being located in the rear box.

2. The hollow structure according to claim 1, the first vertex of the front reinforcement triangle being attached to the front panel at a midpoint of the front panel.

3. The hollow structure according to claim 1, comprising a rear reinforcement triangle comprising three rods, wherein a first end of a first rod is coupled to a first end of a second rod defining a first vertex, a second end of the first rod is coupled to the first end of a third rod defining a second vertex, and a second end of the second rod is coupled to a second end of the third rod defining a third vertex, the three rods thereby forming said rear reinforcement triangle, the rear reinforcement triangle being coupled by the first vertex to the rear panel, by the second vertex to the upper panel, and by the third vertex to the lower panel.

4. The hollow structure according to claim 1, the hollow structure further comprising a plurality of longitudinal boxes, each longitudinal box comprising a front wall which constitutes a vertical reinforcement element.

5. The hollow structure according to claim 1, said structure comprising a central wing box of an aircraft, wherein at least one part of the central wing box is adapted to receive fuel.

6. The hollow structure according to claim 1, wherein the intermediate reinforcement triangle comprises three rods, a first end of a first rod is coupled to a first end of a second rod defining a first vertex, a second end of the first rod is coupled to the first end of a third rod defining a second vertex, and a second end of the second rod is coupled to a second end of the third rod defining a third vertex, the three rods thereby forming said intermediate reinforcement triangle, the intermediate reinforcement triangle being coupled by the first vertex to the at least one intermediate partition, by the second vertex to the upper panel, and by the third vertex to the lower panel, wherein the first and second rods forming the first vertex of the intermediate reinforcement triangle being the only rods coupled to the at least one intermediate partition.

* * * * *

UNITED STATES PATENT AND TRADEMARK OFFICE
CERTIFICATE OF CORRECTION

PATENT NO.       : 7,597,287 B2                                           Page 1 of 1
APPLICATION NO. : 11/090477
DATED            : October 6, 2009
INVENTOR(S)      : Stephane Gay It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Twenty-eighth Day of September, 2010

David J. Kappos
*Director of the United States Patent and Trademark Office*